Patented Apr. 19, 1927.

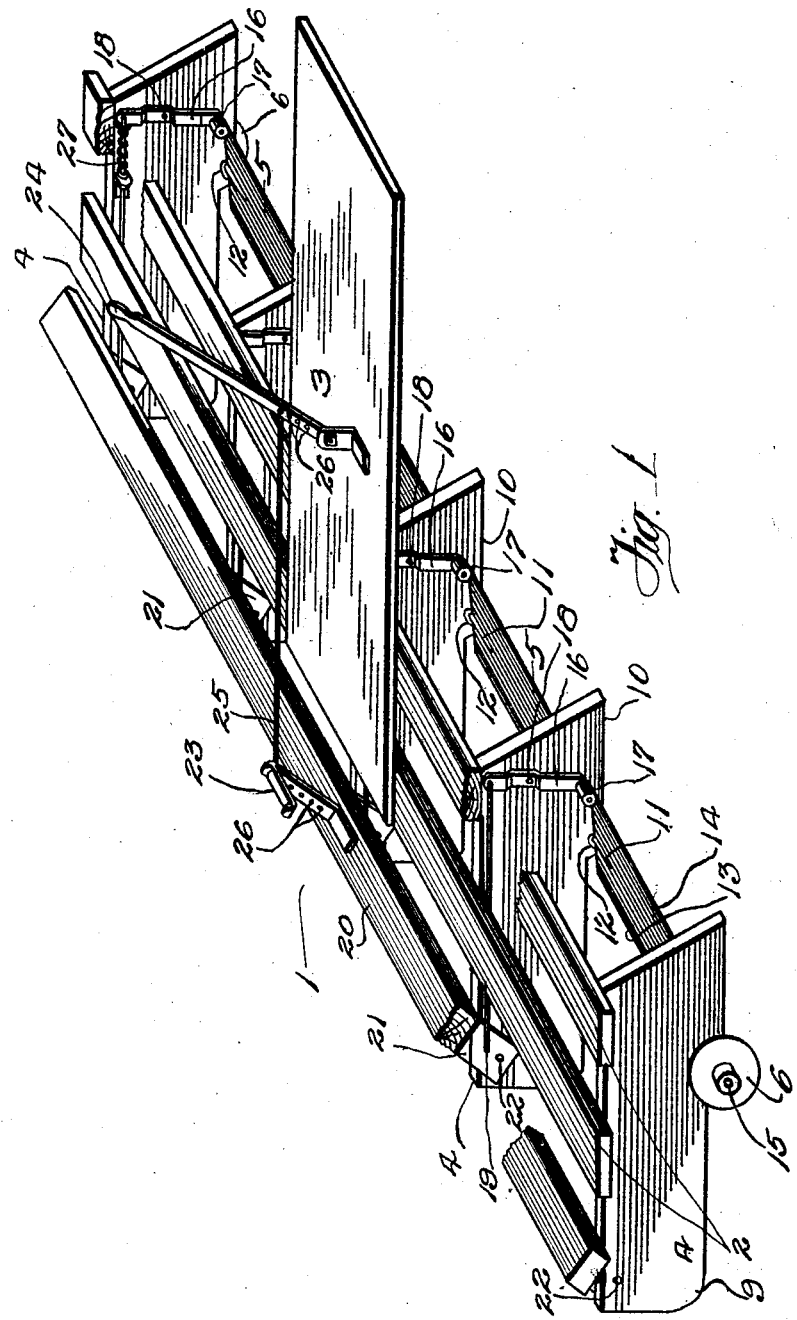

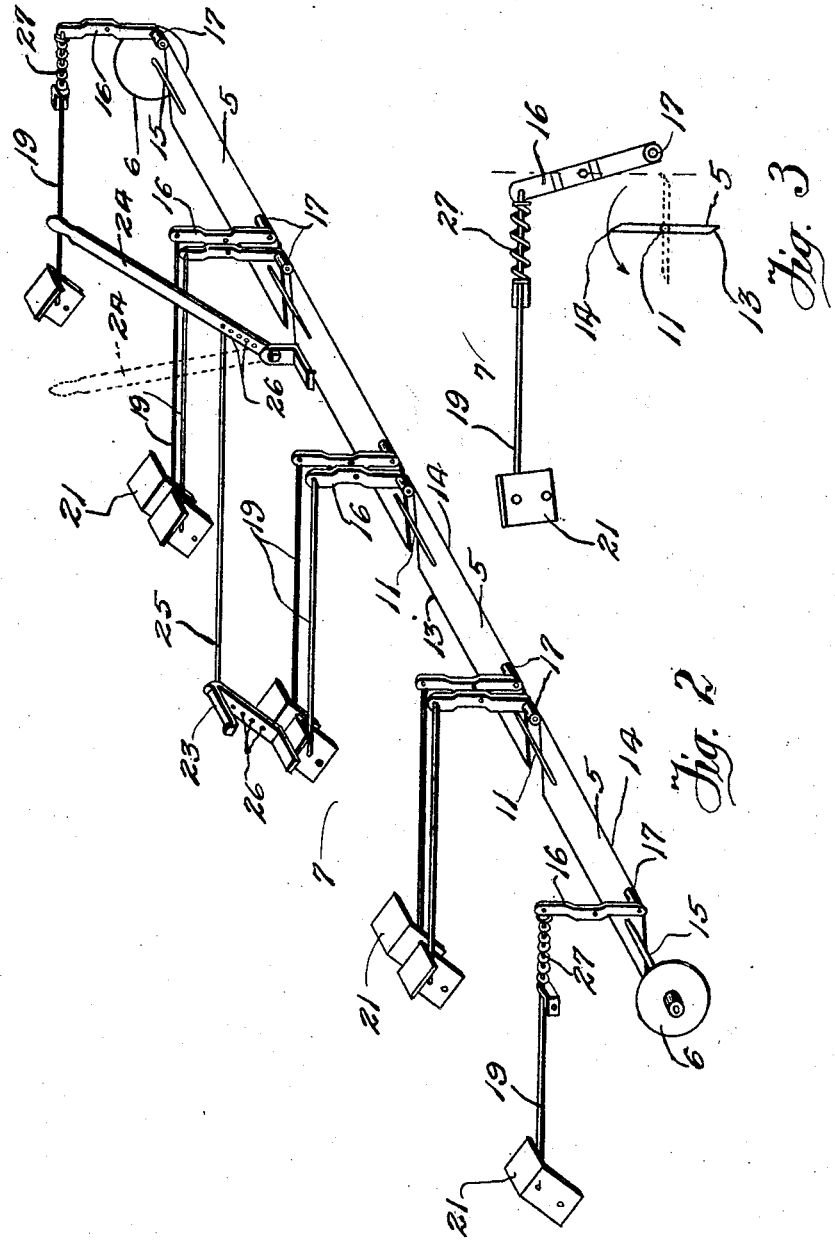

1,625,168

UNITED STATES PATENT OFFICE.

JAMES A. TALBOT, OF WALLA WALLA, WASHINGTON, ASSIGNOR OF ONE-HALF TO S. V. DAVIN, OF WALLA WALLA, WASHINGTON.

WEEDER.

Application filed March 23, 1925. Serial No. 17,462.

This invention relates to weeders and has as one of its objects to provide a weeder having a continuous cutting member that is self cleaning.

Another object of the invention is to provide a weeder having a cutting member with two cutting edges, either of which may be brought into operative position at will.

A further object of the invention is to provide a weeder having a rotating cutting member and having means to control the rotation of this member.

With these and other objects in view reference is now had to the accompanying drawings in which—

Fig. 1 is a perspective view of the weeder with parts broken away to disclose operative details;

Fig. 2 is a perspective view of the tripping means and other mechanical parts of the invention; and Fig. 3 is a side view of one part of the tripping mechanism, showing its relative position with the blade when the latter is released for rotation.

Having reference to the drawings like numerals refer to like parts throughout the several views and the numeral 1 refers to a weeder comprising in general a frame 2, a platform 3 mounted on the frame, runners 4 rigidly attached to the frame, cutting blades 5 movably mounted in the weeder, ground wheels 6, and a tripping means 7.

Specifically the frame comprises longitudinally disposed members that may be spaced apart as shown, or obviously may lay close together to form a sort of flooring if desired.

The platform 3 comprises a board that is rigidly attached to the weeder, and extending rearward therefrom forms a means on which the operator may ride and control the weeder, and affords a convenient support for an operating lever, to be explained.

To the frame a plurality of runners 4 are rigidly attached and these runners may consist of planking, cut as shown, with a rounded front end 9 and with an extended heel 10, or may be made or formed in any suitable manner according to standard practice that will provide a bearing for the various parts that will subsequently be described.

The heel 10 projects below the runner and is utilized to support the cutting blade 5 in a manner that its edge will extend into the soil.

The cutting blade 5 may be of a single continuous blade where the blade is relatively short, but is to be preferably formed of a plurality of blades, as shown, joined longitudinally by longitudinal axles 11, for collective action.

The axles in turn are mounted in journals 12 in the runners in order to provide for the free rotation of the blades 5.

The blades have two cutting edges, 13 and 14 respectively, either of which may be brought into use by rotating the blade.

For the purpose of rotating the blade, end axles 15 are provided and these are rigidly attached to the blade and extend beyond the runners 4, and have mounted thereon wheels 6, the latter being preferably of the disc variety.

The wheels project below the runners to engage the soil and with the motion of the weeder dragging the wheels through the soil, the friction of the soil will obviously rotate the wheels and hence the blades, and thus bring the successive edges of the blades forward and into the soil.

To prevent a continuous rotation of the blade a tripping means 7 is provided to control the rotation and to maintain the blade in an operative position, by contact of the blade with the tripping means, after each full or partial rotation.

The tripping means consists of vertically positioned bars 16 pivotally attached to the runners, and provides a bar for each end of the blade, regardless of the number of blades which go to make up the cutting means.

With a bar at each end of the blade the cutting edge is maintained uniformly in the ground and no twisting or warping can occur.

The bars 16 carry on their lower ends rollers 17 positioned in operable contact with, or in a position complemental to the blades, and are arranged to contact the rear end 14 of the blade, and in a line directly above it, so as to better withstand the strain resulting from the resistance of the soil against the blade during operation.

The bars 16 are pivotally secured to the runners by means of bolts 18, and connecting rods 19 connect the bars with a single lever acting beam 20 that extends longitudinally of the weeder.

The beam is pivotally attached to the runners by plates 21 that are bolted as at 22, to the runners in the usual manner, and to the plates the connecting rods are movably secured in a manner to operate the bars with the forward and backward movement of the beam.

Rigidly attached to the beam is a foot lever 23 wherewith to move the beam forward or back on the bolts 22 to release the rollers 17 from the blades, and a lever handle 24 is provided for the same purpose but by hand operation, and is connected to the foot lever by means of a connecting rod 25, with numerous holes 26 being provided in both members for adjustment purposes.

After tripping the blades the rollers are automatically returned to the position of contact with the blades by means of a spring 27 that is preferaby mounted on the two outer of the connecting rods.

In use the weeder is moved over the ground in the usual manner, and the blade being held in the cutting position by the tripping means will cut the weeds below the surface.

As weeds accumulate on the blade to a point where it is necessary to remove them in order that the work may proceed satisfactorily, the blades are released with the tripping means. This is accomplished by pressing on the foot lever, or by advancing the lever handle when the blade will automatically rotate and present a new cutting edge to the work.

With the new cutting edge to the work obviously the old cutting edge, with its accumulation of weeds, is towards the rear and hence movement through the soil will remove the weeds rearwardly from the blade as the work proceeds.

It is now obvious that with the weeder in motion and with the blade tripped that the blade will rotate, and that the "skip" or unworked soil will be reduced to the minimum corresponding to the distance of travel of the weeder in the time required to rotate the blade through an arc of 180 degrees.

Having thus described my invention, I claim—

1. In a weeder, a frame, a plurality of runners attached to said frame, a plurality of cutting blades joined together by longitudinally disposed axles, and rotatably mounted in said runners, means to rotate said blades, and a tripping means comprising vertically positioned bars pivotally attached to said runners, complemental to each of said blades, and provided with rollers positioned to contact the rear edge of said blade and directly above it, connecting rods connecting said bars with a lever acting beam extending longitudinally of the weeder, and an operating lever operably attached to said beam.

2. In a weeder, a frame, a platform mounted on said frame, a plurality of runners attached to said frame, a plurality of cutting blades joined longitudinally for collective action and rotatably mounted in said runners, means to rotate said blades collectively, and a tripping means comprising vertically positioned bars pivotally attached to said runners, complemental to each of said blades, and provided with rollers positioned to contact the rear edge of said blades, connecting rods connecting said bars with a single lever acting beam extending longitudinally of said weeder, a foot lever attached to said beam, a lever handle operably attached to said platform, and a connecting rod connecting said lever handle and said foot lever.

3. In a weeder, a frame, a plurality of runners attached to said frame, a plurality of cutting blades joined together longitudinally for collective action, and rotatably mounted in said runners, means to rotate said blades collectively, and a tripping means comprising vertically positioned bars pivotally attached to said frame, and provided with rollers positioned in contact with the rear edge of said blades, a beam extending longitudinally of said weeder and yieldingly connected to said bars, and means to manually operate said tripping means.

In testimony whereof I affix my signature.

JAMES A. TALBOT.